United States Patent Office 3,264,008
Patented August 2, 1966

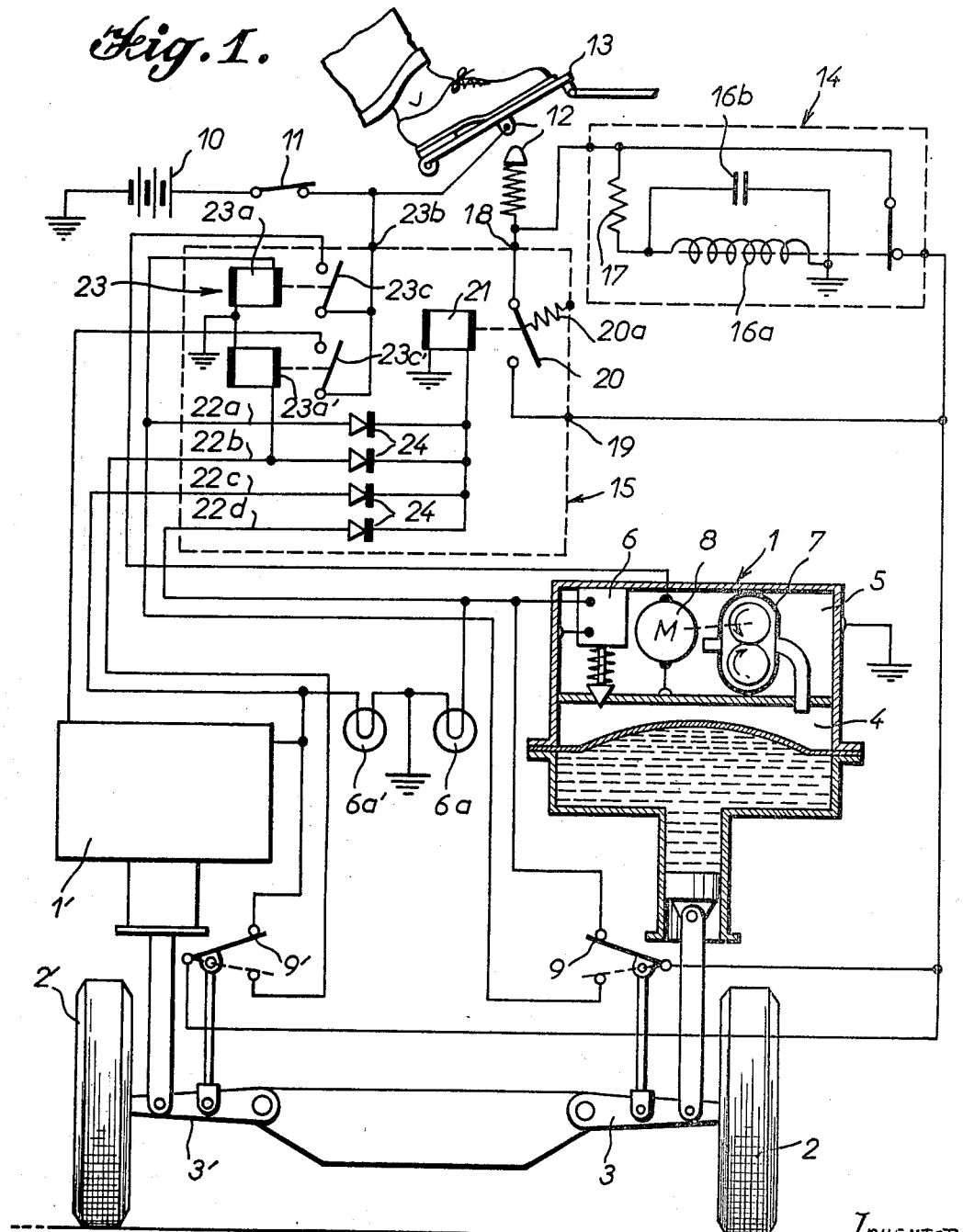

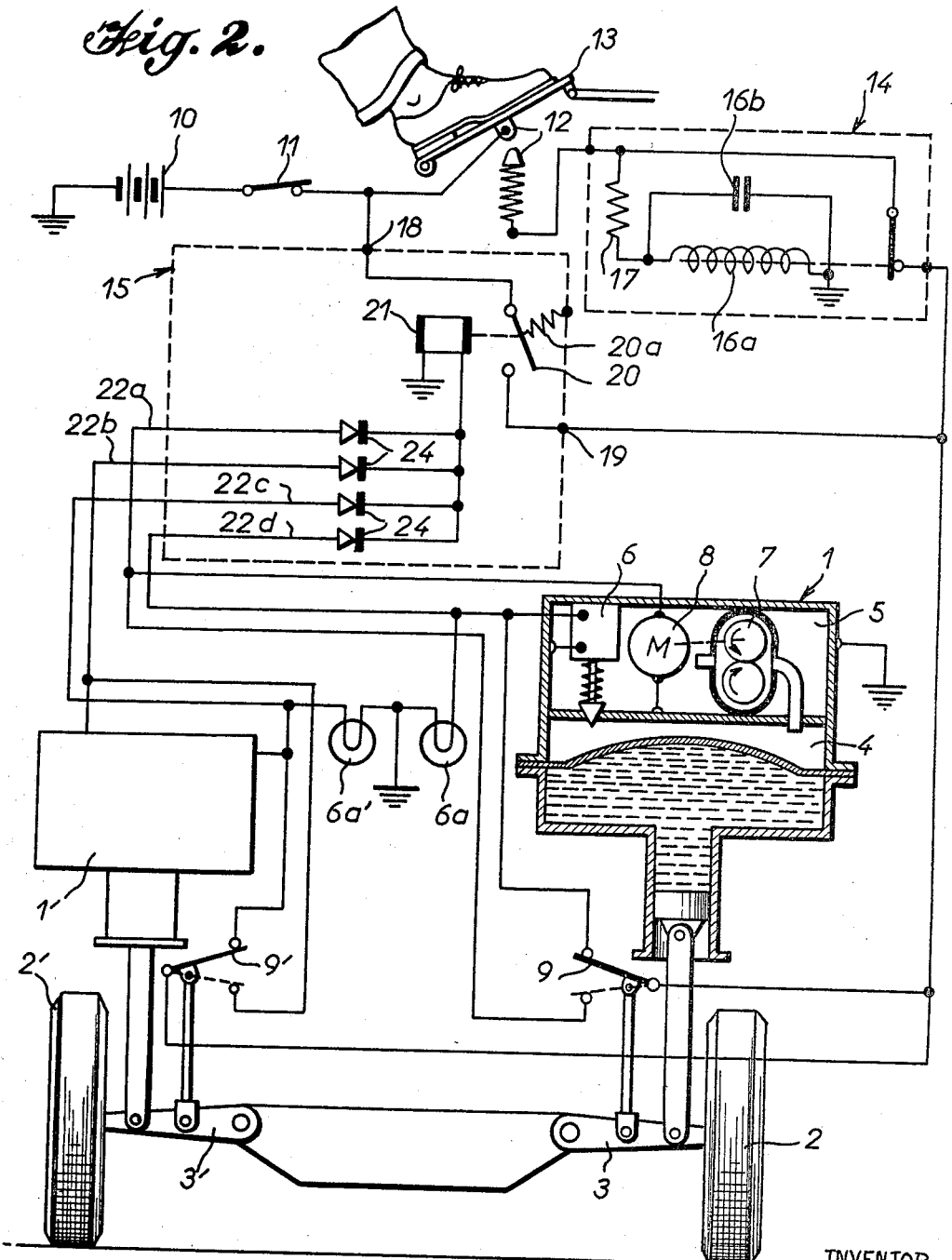

3,264,008
VEHICLES HAVING ELECTRICALLY CONTROLLED AUTOMATIC LEVEL-CORRECTING SUSPENSION
Fernand Stanislas Allinquant, 53 Ave. Le Notre, Sceaux, France
Continuation of application Ser. No. 326,952, Nov. 29, 1963. This application Sept. 28, 1965, Ser. No. 490,790
Claims priority, application France Dec. 5, 1962, 917,637, Patent 1,379,617
5 Claims. (Cl. 280—6)

This is a continuation of my application Serial No. 326,952 filed November 29, 1963.

In my U.S. patent application No. 158,740 filed on November 12, 1961, now U.S. Patent No. 3,122,379, there are described level-correcting assemblies applicable, in particular, to vehicles having oleopneumatic suspension and using an electrical device for height-detection and for controlling the feeding of the suspension. Such feeding, which takes place only intermittently, is effected under the control of voltage pulses triggered by the accelerator pedal, means for the transfer of a fluid between two chambers in which different pressures prevail being adapted to be energized during the duration of the pulses through the intermediary of movable contacts responsive to the position of the wheels or other unsuspended parts of the vehicle with respect to the suspended body or chassis of the latter. Provision if further made for prolonging the effect of such a pulse by means of a "re-feed" device whereby, after a movement which has produced a pulse, the said transfer means operates continuously, whatever the position of the accelerator, until a correct level is obtained.

This invention relates to an electrical feeding device of the above-mentioned "re-feed" type which is easy to produce and to mount on a vehicle, irrespective of the number of transfer means. This object can be reached, according to the invention, by use of a single "re-feed" relay which can be energized by any transfer means set into operation by impulse producing means. The "re-feed" relay has an energizing coil connected through an electrical unidirectional element such as a diode in parallel with each of said transfer means.

According to an advantageous optional feature of the invention, at least one of the transfer means, which required an electrical current exceeding the rating of the associated unidirectional current flow means, is fed through the medium of a power relay associated with the "re-feed" relay and directly fed by the electrical generator through the general vehicle switch.

A more particular object of this invention is to avoid undue level-correction, during a temporary stop at a traffic light for example, an automatic suspension functioning in bad conditions, when brakes are applied. In one embodiment of the invention, this object is reached by mounting impulse producing means comprising a main switch actuated by the accelerator pedal and delaying means, in the circuit which leads from the electrical generator to the transfer means and to the energizing coil of the "re-feed" relay. This embodiment is specially designed to break the circuit established by the accelerator pedal after a certain period, whatever the total time during which the driver's foot bears on the pedal may be. The circuit comprising the "re-feed" relay mobile armature is by-passed by said delaying means but includes the main switch.

In another embodiment, the main switch and the delaying means determining the time and the total duration of the correction initiating impulses are always connected in a series yet are by-passed by a "re-feed circuit comprising a "re-feed" relay mobile armature.

The invention will be described below with reference to the accompanying drawings which show by way of example forms of device, in which:

FIG. 1 is a diagram, with partial section, of a first embodiment of a level-correcting device associated with the suspension elements of a set of wheels of a vehicle; and FIG. 2 is a diagram, with partial section, of a second embodiment of a level-correcting device associated with the suspension elements of a set of wheels of a vehicle.

In FIG. 1, there is shown an oleopneumatic suspension unit 1 associated with a wheel 2 which is carried by an arm 3 and the associated level-correcting device which carries out electrical height detection and controls the feeding of the suspension system. Like wheels and suspension systems have been schematically shown and are referred to with prime numbers.

The suspension unit 1 comprises, for example, two chambers 4 and 5 for each wheel unit, which chambers are filled with gas under pressure and which are enabled to communicate with one another by means of transfer means such an electric valve 6 and a compressor 7, which latter is driven by an electric motor 8. The compressor 7 is advantageously of a type employing pistons but, for the sake of simplicity, it is shown in the drawings as a volumetric machine embodying gear wheels.

The transfer means 6 and 7 are under the control of at least one height-detecting contact 9 which is connected to a wheel 2 of the vehicle and permits one or the other of them to be energized when the level of the vehicle is temporarily incorrect. They may each have an indicator lamp such as 6a associated therewith.

The feed-controlling device proper comprises an electrical generator 10, a general switch 11 actuated by a key, for instance, a main switch 12 actuated by the accelerator pedal 13, so as to be closed beyond a predetermiend point of the travel of the latter, a slow-acting relay 14 and a re-feed relay 15.

The slow-acting relay 14, which is known per se, is disposed immediately on the negative side of the main switch 12 and is normally closed. It has an energizing circuit comprising an induction coil 16a and a condenser 16b connected in parallel, and a resistance 17 is disposed in series with the said energizing circuit and controls the intensity of the current passing through the latter.

The re-feed relay 15 has two main terminals 18 and 19 connected by an armature 20 which is normally held open by a spring 20a, but it subject to the action of an energizing coil 21; the latter terminal is connected to the various transfer means by connections 22a, 22b, 22c, 22d, each of which includes a unidirectional connecting element 24 such as a diode. Each transfer means would be connected in parallel between, height detecting contact 9 and the ground-return to a connection such as 22b.

The motor and compressor set 7 and 8 requiring a rather substantial current intensity, it is supplied through the intermediary of a power relay 23, the armature of which bears the reference 23c and whose energizing coil 23a is joined to the connection 22a, the supply terminal 23b for the motor 8 then being connected to a point located between the general switch 11 and the main switch 12 actuated by the accelerator pedal.

It will be observed on FIG. 1 that the terminal 18 of the "re-feed" relay is connected to the negative side of said main switch 12. All the circuits are moreover of the single-wire ground-return type, such as are current'y used in the electrical systems of motor vehicles.

The operation of a device of this kind is as follows:

After the main switch 11 has been closed, the starting of the vehicle engine is accompanied by depression of the accelerator pedal 13, which closes the contact 12. The resulting energization of the circuits 16a, 16b by way of the resistance 17 results in the opening of the slow-acting relay 14 after a time delay which, in practice, is fixed. If, during this time, there is any incorrectness in the level of the vehicle, there will be upward or downward closing of the contact 9 and energization of the transfer means of the suspension of the vehicle (that is to say, the electric valve 6 in the drawing), possibly with closing of a relay such as 23. The diodes 24 or other unidirectional connecting elements 24 provided in the connections 22a, 22b, 22c, 22d prevent stray simultaneous energization of several transfer means.

When one of the connections 22a, 22b, 22c, 22d energizes the coil 22 of the "re-feed" relay, the armature 20 connects the terminals 18 and 19, the result of which is that the transfer means hereabove mentioned can still operate after the opening of the slow-acting relay 14 as long as the contact 9 and, of course, the switch 12 remain closed.

During the whole operation of the transfer means, the masses of gas contained in the respective chambers 4 and 5 therefore vary in the sense which tends to restore the normal level of the vehicle.

In FIG. 2, there is shown an alternative embodiment according to which the terminal 18 of the "re-feed" relay is connected to an electrical generator in parallel with the switch 12 instead of in series with the latter. The embodiment of the FIG. 1 is advantageous, however, in that it avoids any premature operation of the level-correcting device during a temporary stop. In a vehicle having provision for level correction, the application of the brakes in the case of such a stop can produce considerable strain in the suspension. However, as the acceleration pedal cannot remain depressed without the engine racing, the switch 12 is therefore necessarily opened.

The device described can be easily adapted to the characteristics of any particular vehicle and even, if required, of the individual driver, by adjustment of the closing travel of the switch 12 and adjustment of the delay time of the relay 14. This provides final adjustment of that part of the driving time during which the electrical level-correcting device proper 6, 7, 8, 9 happens to be actuated by jolting or any other cause, for the purpose of restoring the normal level of the vehicle by successive pulses or stages. Light indicators or signals such as 6a enable the driver to obtain, if desired, an idea of the frequency of the corrections and to check the functioning of the suspension.

It is obvious that the invention is not limited to the embodiments which have been particularly described, but that it also covers modifications which can be obtained, within the scope of the appended claims by the use of equivalent technical means.

What is claimed is:

1. In a vehicle having a body, an accelerator pedal, wheels and a fluid suspension system, at least one suspension element associated with each wheel for supporting said body, electrically actuated transfer means for controlling an active fluid mass enclosed within said element, an electrical level-correcting device comprising, in combination, a wheel-switch associated with each wheel for detecting the position thereof relative to said body and for controlling thereby the actuation of said transfer means, impulse-producing means comprising switching means and an electric power source, said impulse-producing means connecting said wheel switch to said electric power source only at selective intervals, a re-feed relay of the normally open type having an energizing coil and a mobile armature actuatable by said coil, said armature in its closed position by-passing said impulse-producing means by closing a circuit between said power source and said wheel switch, at least one unidirectional current flow means connecting said energizing coil to each and every one of said transfer means for providing energiaztion of said coil at the same time as any one of said transfer means but preventing stray simultaneous energization of several transfer means.

2. An electrical level-correcting device according to claim 1 wherein said unidirectional current flow means are diodes.

3. An electrical level-correcting device according to claim 1 wherein said switching means comprises a main switch and a normally closed slow-acting relay connected in series between said main switch and said transfer means, said main switch being actuated by said accelerator pedal.

4. In a vehicle having a body, an accelerator pedal, wheels, and a fluid suspension system, at least one suspension element associated with each wheel for supporting said body, electrically actuated transfer means for controlling an active fluid mass enclosed within said element, an electrical level-correcting device comprising in combination, a wheel-switch associated with each wheel for detecting the position thereof relative to said body and for controlling thereby the actuation of said transfer means, impulse-producing means comprising switching means and an electric power source, said impulse-producing means connecting said wheel switch to said electric power source only at selective intervals, a re-feed relay of the normally open type having an energizing coil and a mobile armature actuatable by said coil, said armature in its closed position closing a circuit between said power source and said wheel switch, at least one unidirectional current flow means connecting said energizing coil to each and every one of said transfer means for providing energization of said coil at the same time as any one of said transfer means but preventing stray simultaneous energization of several transfer means, a power relay for the purpose of energizing one of said transfer means necessitating an electrical current exceeding the rating of the associated unidirectional current flow means, said power relay comprising a second energizing coil connected in parallel with a unidirectional current flow means, a second mobile armature actuatable by said second coil, a power circuit including said armature, and said power circuit connecting said transfer means to the electrical power source.

5. An electrical level-correcting device according to claim 4 wherein said switching means comprises a main switch actuated by said accelerator and a normally closed slow-acting relay connected in series between said main switch and said transfer means, said re-feed relay in its closed position by passing said slow-acting relay.

No references cited.

BENJAMIN HERSH, *Primary Examiner.*

M. S. SALES, *Assistant Examiner.*